US00RE49685E

(19) United States
(12) Reissued Patent
Morgan et al.

(10) Patent Number: US RE49,685 E
(45) Date of Reissued Patent: Oct. 10, 2023

(54) MEDICAL MATTRESS WITH FIRMNESS ADJUSTMENT

(71) Applicant: Direct Supply, Inc., Milwaukee, WI (US)

(72) Inventors: Justin Taylor Morgan, Cedarburg, WI (US); Anthony J. Patrick, Delafield, WI (US); Joshua James Jakubowski, Port Washington, WI (US)

(73) Assignee: Direct Supply, Inc., Milwaukee, WI (US)

(21) Appl. No.: 16/413,851

(22) Filed: May 16, 2019

Related U.S. Patent Documents

Reissue of:
(64) Patent No.: 9,877,591
Issued: Jan. 30, 2018
Appl. No.: 14/018,946
Filed: Sep. 5, 2013

U.S. Applications:
(60) Provisional application No. 61/707,540, filed on Sep. 28, 2012.

(51) Int. Cl.

| | |
|---|---|
| ***A47C 27/14*** | (2006.01) |
| ***A47C 27/15*** | (2006.01) |
| ***A61G 7/05*** | (2006.01) |
| ***A61G 7/057*** | (2006.01) |
| *A61G 7/015* | (2006.01) |

(52) U.S. Cl.
CPC ..... *A47C 27/148* (2013.01); *A47C 27/15* (2013.01); *A61G 7/05715* (2013.01); *A61G 7/015* (2013.01); *A61G 7/0525* (2013.01); *A61G 2205/30* (2013.01)

(58) Field of Classification Search
CPC .. A47C 27/148; A47C 27/15; A61G 7/05715; A61G 7/0525; A61G 7/015; A61G 2205/30
See application file for complete search history.

(56) References Cited

U.S. PATENT DOCUMENTS

| | | | | |
|---|---|---|---|---|
| 1,371,362 | A * | 3/1921 | Giese | 5/727 |
| 3,110,042 | A | 11/1963 | Slemmons | |
| 3,118,153 | A | 1/1964 | Hood | |
| 3,534,417 | A * | 10/1970 | Boyles | A47C 27/16 5/727 |
| 3,885,258 | A | 5/1975 | Regan | |
| 3,939,508 | A * | 2/1976 | Hall | A47C 27/15 5/727 |
| 4,286,344 | A * | 9/1981 | Ikeda | 5/717 |
| 4,476,594 | A * | 10/1984 | McLeod | 5/701 |

(Continued)

FOREIGN PATENT DOCUMENTS

| | | |
|---|---|---|
| DE | 1940763 | 8/1969 |
| GB | 2244000 A | 11/1991 |

OTHER PUBLICATIONS

The International Search Report and Written Opinion of PCT/US2013/061821.

(Continued)

*Primary Examiner* — Catherine S Williams
(74) *Attorney, Agent, or Firm* — Boyle Fredrickson, S.C.

(57) ABSTRACT

A mattress for institutional use provides upper and lower surfaces offering different levels of firmness through the use of gradiated firmness in multiple polymer foam layers.

31 Claims, 3 Drawing Sheets

(56) References Cited

U.S. PATENT DOCUMENTS

| | | | | | |
|---|---|---|---|---|---|
| 4,726,083 | A * | 2/1988 | Hoshall | 5/411 | |
| RE32,734 | E * | 8/1988 | McLeod | 5/722 | |
| 4,829,615 | A * | 5/1989 | Raymond | 5/731 | |
| 4,901,387 | A * | 2/1990 | Luke | 5/730 | |
| 5,259,079 | A * | 11/1993 | Visser et al. | 5/685 | |
| 5,513,402 | A | 5/1996 | Schwartz | | |
| 5,701,623 | A * | 12/1997 | May | 5/739 | |
| 5,953,779 | A * | 9/1999 | Schwartz | 5/722 | |
| 6,115,861 | A * | 9/2000 | Reeder et al. | 5/727 | |
| 6,481,033 | B2 * | 11/2002 | Fogel | 5/727 | |
| 6,848,130 | B1 * | 2/2005 | Wilson | 5/425 | |
| 7,086,108 | B1 * | 8/2006 | Litvak | 5/723 | |
| 7,340,788 | B1 * | 3/2008 | Traub | 5/697 | |
| 7,904,977 | B1 * | 3/2011 | Singh | A47G 9/0246 | 5/497 |
| 2001/0027576 | A1 | 10/2001 | Kosumsupparnala et al. | | |
| 2003/0221262 | A1 | 12/2003 | Torbet et al. | | |
| 2004/0181879 | A1 * | 9/2004 | Prince et al. | 5/690 | |
| 2005/0034241 | A1 * | 2/2005 | Prince et al. | 5/690 | |
| 2006/0016003 | A1 * | 1/2006 | Garrigues | 5/420 | |
| 2008/0098533 | A1 * | 5/2008 | Erdman | 5/722 | |
| 2008/0154670 | A1 * | 6/2008 | McAlhaney | 705/7 | |
| 2008/0201856 | A1 * | 8/2008 | Howard | 5/690 | |
| 2008/0256706 | A1 * | 10/2008 | Larsen | A47C 31/105 | 5/425 |
| 2008/0256716 | A1 * | 10/2008 | Wahrmund | A47C 27/15 | 403/381 |
| 2008/0301983 | A1 * | 12/2008 | Murphy et al. | 40/360 | |
| 2009/0165213 | A1 * | 7/2009 | Collins et al. | 5/740 | |
| 2010/0058541 | A1 | 3/2010 | Kemper | A47C 31/001 | 156/182 |
| 2010/0115702 | A1 * | 5/2010 | Biggie et al. | 5/690 | |
| 2010/0170042 | A1 | 7/2010 | Rose | | |
| 2010/0269259 | A1 * | 10/2010 | Campbell | A47C 21/022 | 5/498 |
| 2012/0137443 | A1 * | 6/2012 | Howard | 5/720 | |
| 2013/0081208 | A1 * | 4/2013 | Dyevich et al. | 5/727 | |
| 2013/0174344 | A1 | 7/2013 | Klancnik et al. | | |
| 2013/0174349 | A1 * | 7/2013 | Amaral et al. | 5/737 | |
| 2013/0247304 | A1 * | 9/2013 | O'Reagan et al. | 5/737 | |
| 2013/0269114 | A1 * | 10/2013 | Wu | 5/716 | |
| 2014/0068869 | A1 * | 3/2014 | Lafleche et al. | 5/724 | |

OTHER PUBLICATIONS

Website: http://southernightsmattress.com/Healthcare.html.; Southern Nights Mattress Company; The Wellness Collections—(Commercial) Healthcare/Hospitals; admitted prior art.

* cited by examiner

MEDICAL MATTRESS WITH FIRMNESS ADJUSTMENT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

This application *is a reissue of U.S. Pat. No. 9,877,591 issued on Jan. 30, 2018 from U.S. patent application Ser. No. 14/018,946 filed Sep. 5, 2013, which* claims the benefit of U.S. provisional application 61/707,540 filed Sep. 28, 2012 and hereby incorporated by reference.

BACKGROUND OF THE INVENTION

The present invention relates to mattresses providing pressure redistributing surfaces for medical or other use and in particular to a mattress providing for two different mattress firmnesses.

Mattresses intended for hospitals or long-term care may provide for a pressure redistribution layer intended to help reduce regions of pressure that may lead to pressure ulcers. One method of providing a pressure redistribution layer employs multiple layers of polyurethane or similar foam with the top layer that may be die cut or convoluted. Mattresses providing a pressure redistribution layer suitable for medical or institutional use will henceforth be termed "medical mattresses". Such mattresses are generally intended to be used with articulating hospital or long-term care beds that allow the mattress to be flexed by a bed mechanism to elevate or lower a head, foot, or middle section.

Long-term care or hospital residents (henceforth patients) usually cannot choose the firmness of their mattress. While some facilities may purchase medical mattresses with different firmnesses, this approach is burdensome and expensive and does not allow for patient choice. To address this problem, mattresses may be constructed of two layers of polymer foam, for example, a top layer of softer foam and a bottom layer of firmer foam. By flipping the mattress, a different layer is presented at the upper surface of the mattress. Such mattresses may not provide for effective pressure redistribution necessary for reducing pressure points such as may cause localized blood circulation loss and ulceration.

SUMMARY OF THE INVENTION

The present invention provides a medical mattress that may be flipped to expose one of two different surfaces presenting different firmnesses. Improved pressure redistribution is obtained by multiple foam layers providing a more gradual transition in firmness. In some embodiments, a nonslip surface may be re-positionably attached on the lower surface depending on the mattress orientation to better hold the mattress in position during bed articulation. In some embodiments, peripheral foam walls (bolsters) may be re-positionably attached on the upper surface depending on the mattress orientation to help reduce the risk of patient falls from the mattress. In some embodiments, one end of the mattress may have opposed heel slopes to help reduce heel pressure regardless of mattress orientation. While developed for medical use, the mattress clearly has utility in other settings including schools, homes and vehicles, and the invention is not limited to a particular market.

In one embodiment, the present invention provides a mattress having a mattress body with opposed first and second supporting surfaces each sized to receive and support a supine individual when the surface is upwardly facing and horizontal. The mattress body includes at least three polymer foam layers having different firmnesses and extending along substantial portions of the mattress length. A firmness of the polymer foam layers is selected to present a lesser firmness to a supported individual lying on the first supporting surface than to the supported individual lying on the second supporting surface. A cover fits around the mattress body to retain the mattress body therein.

It is thus a feature of at least one embodiment of the invention to provide a single mattress that can offer different levels of firmness for different individuals and yet which provides for sufficient pressure redistribution to minimize pressure points for bedridden patients. By employing a gradiated structure of multiple foam layers, a trade-off between reducing point pressure and increasing broad area support can be managed.

A first polymer foam layer adjacent to the first supporting surface may have a lesser indentation force deflection (IFD) than the polymer foam layer adjacent to the second supporting surface. A third polymer foam layer positioned between the first and second polymer foam layers may have an IFD greater than the IFD of the first polymer foam layer and the second polymer foam layer.

It is thus a feature of at least one embodiment of the invention to provide a firm center core layer improving broad area support to both the soft and firm face while still allowing different firmnesses on the different faces.

The mattress may include a fourth polymer foam layer positioned between the first and third polymer foam layers having a greater IFD than the first polymer foam layer and a lesser IFD than the third polymer foam layer.

It is thus a feature of at least one embodiment of the invention to provide a graduated change in firmness of the foam layers to better accommodate the competing desires of different firmnesses and isolation of the different firmnesses on the single mattress.

The different polymer foam layers extending along at least a portion of the first and second supporting surface may exclude a foot portion adapted to support feet of a supine individual. A foot region polymer foam element may extend along the mattress length in the foot portion having firmness no more than the least firmness of the different polymer foam layers outside of the foot portion.

It is thus a feature of at least one embodiment of the invention to provide improved foot comfort by eliminating heel pressure points in a reversible mattress.

The foot region polymer foam layer may have a uniform firmness.

It is thus a feature of at least one embodiment of the invention to simplify the construction of the foot region of the mattress.

The foot region may provide a reduced mattress thickness tapering inward to an end of the mattress.

It is thus a feature of at least one embodiment of the invention to further reduce pressure on the heel or foot by depressing the relative surface height of the mattress in the heel region.

The mattress may include a second cover outside the first cover wherein the second cover includes indicia indicating relative firmness of the first and second opposed surfaces.

It is thus a feature of at least one embodiment of the invention to guide users in orienting the mattress correctly for desired firmness.

The inner cover may include indicia indicating relative firmness of the first and second opposed surfaces.

It is thus a feature of at least one embodiment of the invention to allow the outer cover to be removed and reinstalled correctly.

The first and second opposed surfaces may be substantially planar without a convoluted surface.

It is thus a feature of at least one embodiment of the invention to provide firmness variations that do not rely on complex surface treatment.

The mattress may include a bottom cover adjustable to be positioned over at least a portion of the bottom of the mattress when the mattress is in either of two orientations with the opposed first or second supporting surface uppermost, the bottom cover including outwardly exposed anti-slip material.

It is thus a feature of at least one embodiment of the invention to provide a reversible mattress that nevertheless offers slip resistance.

The bottom cover may be permanently attached to a cover fully surrounding the mattress at one edge of the bottom cover and releasably attachable to the cover fully surrounding the mattress at an opposed edge of the bottom cover.

It is thus a feature of at least one embodiment of the invention to provide a simple method of changing the surface of slip resistance depending on the orientation of the mattress with reduced risk of loss or omission of the slip resistant surfaces.

The bottom cover may be releasably attachable to a mattress cover with hook and loop fasteners.

It is thus a feature of at least one embodiment of the invention to provide an attachment method consistent with commercial laundering of the cover material.

The mattress may include a top cover adjustable to be positioned over at least a portion of the top of the mattress body when the mattress body is in either of two orientations with the opposed first or second supporting surface uppermost, the top cover providing upwardly extending bolsters positionable at opposed left and right edges of the mattress body.

It is thus a feature of at least one embodiment of the invention to provide a reversible mattress that offers bolsters on its upper surface.

These particular objects and advantages may apply to only some embodiments falling within the claims and thus do not define the scope of the invention.

DETAILED DESCRIPTION OF THE PREFERRED EMBODIMENT

Figure 1:
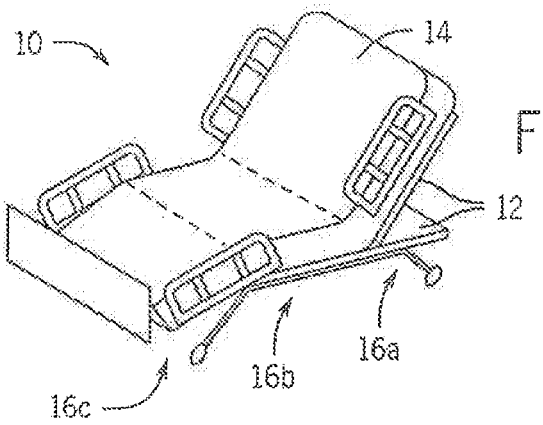
FIG. 1 is a simplified perspective view of an articulating hospital bed suitable for hospital or institutional use.

Referring now to FIG. 1, a hospital bed 10 or the like may provide for an articulating carriage 12 for supporting a mattress 14 thereupon. The articulating carriage 12 may provide, for example, multiple hinging sections 16 including a head section 16a, center section 16b, and foot section 16c, that may be angled to flex the mattress 14 to conform with the sections 16, for example, to raise the head of the mattress 14 or lower the foot of the mattress 14. For this purpose, the mattress 14 may flex to follow motion of the sections 16.

Figure 2:
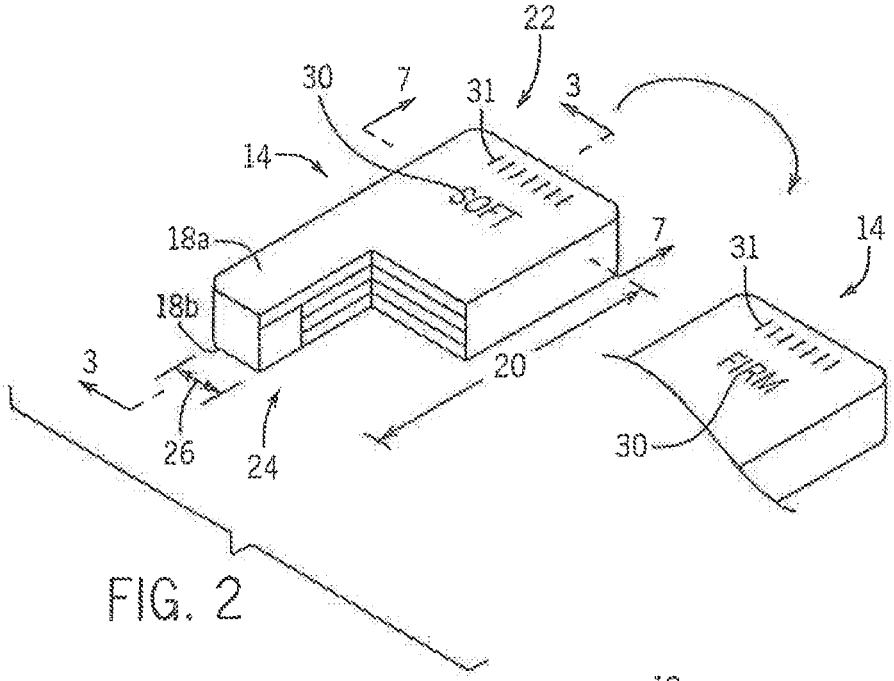
FIG. 2 is a perspective view in partial cutaway of one embodiment of the mattress of the present invention with the soft surface facing upward showing an internal layer configuration and a fragmentary perspective view of the same mattress rotated with the firm surface facing upward.

Referring now to FIG. 2, the mattress 14, when unarticulated, may present a generally planar cushion having opposed broad surfaces presenting a soft face 18a on one side and a firm face 18b on an obverse side separated by a mattress thickness, for example, of five to eight inches. Each of the faces 18 extends along the mattress length 20 from a head end 22 to a foot end 24, for example, any of 76, 80, and 84 inches, and extends along the mattress width 26 between left and right sides, for example, of any of 35, 39 and 42 inches. It will be appreciated that a variety of other dimensions may also be provided. The mattress 14 is generally sized to support a supine adult along its length (the mattress length extending from head end 22 to foot end 24) on either of the soft face 18a or firm face 18b when that face is horizontal and uppermost.

The soft face 18a may be labeled with a firmness designator 30 such as the word "soft" or other similar phrase or symbol as well as manufacturer information 31 visible when the soft face 18a is positioned on top. Conversely the firm face 18b may be labeled with a firmness designator 30 such as the word "firm" or other similar phrase or symbol together with manufacturer information 31 visible when the firm face 18b is positioned on top. An indication of the head of the mattress 14 may be provided, for example, in the orientation of the firmness designators 30 being positioned to be read while facing the head of the mattress 14 or other designator (not shown). These firmness designators 30 may be applied directly to the outer faces of the elastomeric foam described below.

Figure 3:
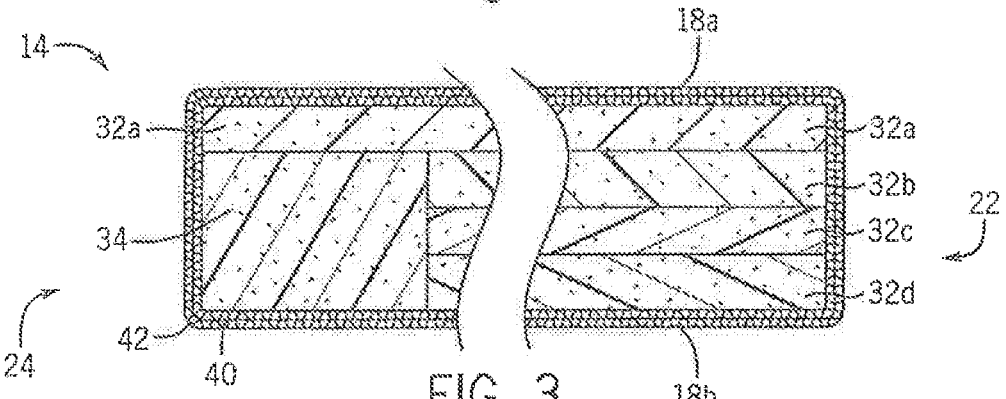
FIG. 3 is a fragmentary cross-section taken along lines 3-3 of FIG. 2 showing multiple internal foam layers and outer covering materials of the present invention in one embodiment.

Referring now to FIG. 3, the mattress 14 may be constructed from multiple parallel laminated layers 32 and 34 each of an elastomeric foam material such as polyurethane foam. The foam layers 32 will generally have a width substantially equal to the width of the mattress 14 and a thickness being a fraction of the thickness of the mattress 14 so that the number of layers 32 times their thickness equals the thickness of the mattress 14. The width may be reduced slightly when side bolsters 76 are used as described below.

All but the outermost, softest of foam layers 32a will have a length slightly shorter than the length of the mattress 14 to extend from a head end 22 of the mattress 14 to a point just short of the foot end 24 of the mattress 14 where a patient's heels would rest. This length will generally be at least three quarters of the length of the mattress. The outermost, softest foam layer 32a may, in contrast, extend the full length of the mattress 14.

Foam layer 34 will have a width generally equal to the width of the mattress 14 and a total thickness comparable to the thicknesses of the layers 32 minus the softest, outermost foam layer 32a. The length of foam layer 34 will be such as to make up the difference between the length of the inner foam layers 32 and the length of the mattress 14 and so that layer 34 is positioned primarily beneath the heel of the patient when the patient is resting on the mattress 14.

Figure 4:
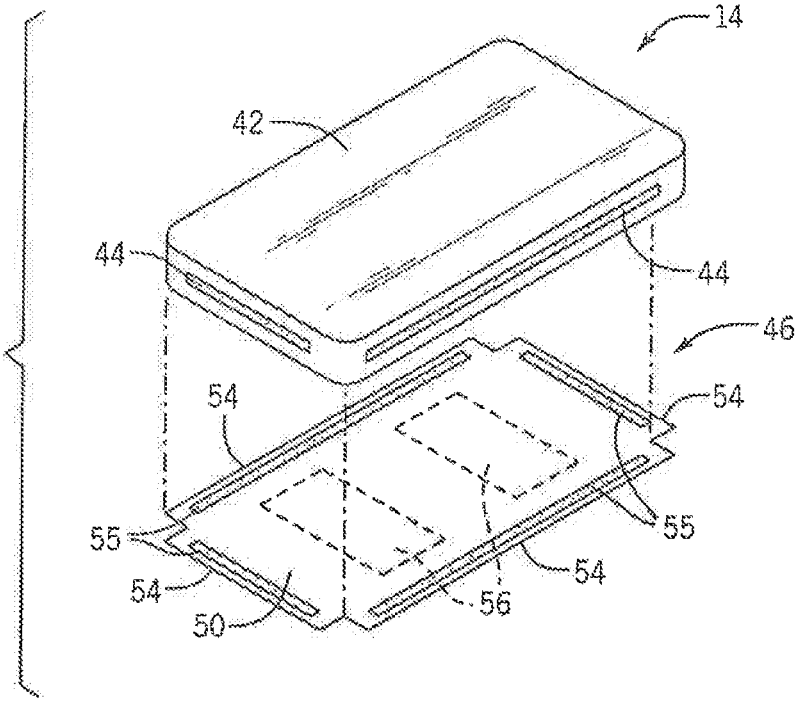
FIG. 4 is an exploded perspective view of the mattress of FIG. 2 and a repositionable bottom cover providing a nonskid surface when attached to the mattress.

In one embodiment, as shown in FIGS. 3 and 4, layers 32a-32d will be provided assembled together by adhesive into a unitary mattress core. Specifically layer 32a may be positioned proximate to the soft face 18a and layer 32d may be positioned proximate to the firm face 18b. Layer 32a may then have its inner broad surface attached to a first broad surface of layer 32b with the second broad surface of layer 32b attached to a first broad surface of layer 32c, and with the second broad surface of layer 32c attached to the inner broad surface of layer 32d.

Generally the layers 32 will each have a different firmness, for example, as designated by an indentation force deflection number (IFD), for example, as measured by ASTM D3574 for a uniform volume of material (e.g., a 15" by 15" by 4" foam slab). Preferably, layer 32a is softer (lower IFD number) than layer 32d and layer 32b will be softer than layer 32c. Layer 32b, on the other hand, will be harder than layer 32a, and layer 32c will be harder than layer 32d. Accordingly, a relatively firm middle layer, for example including layers 32b and 32c, which is normally used on the bottom of medical mattresses, is placed in the center of the mattress 14. Positioning the firm layer in the middle of mattress 14 allows both top and bottom sides of the mattress 14 to provide improved weight capacity and pressure redistribution when used on either face 18a or face 18b.

The layers 34 under the patient's heel will desirably each provide low IFD values so as to reduce point pressures on the patient's heel. This layer may be of uniform IFD value, for example, comparable to layer 32a.

Layer 34 may be attached in a butt joint to the layers 32 by adhesive.

One possible selection of foam values for each layer is provided in the following table:

TABLE I

| Section | Layer | IFD for standard test sample | Thickness (inches) |
|---|---|---|---|
| All | 32a | 7 | 1.5 |
| Head and torso | 32b | 13 | 1.5 |
| | 32c | 75 | 1.0 |
| | 32d | 20 | 2.5 |
| Heels | 34 | 7 | 6.5 total |

Referring still to FIG. 3, the layers 32 and 34 when assembled may be covered by Nomex® or another fire resistant material 40 to provide a burn resistant "sock" which in turn may be covered by a stretchable fabric cover 42 possibly including waterproof qualities. This latter fabric cover 42 may provide for a zipper to allow it to be removed, cleaned, and then re-installed and includes the manufacturer information 31 and firmness designator 30, described above, printed or embroidered on the outer surface. The cover 42 may, for example, be made of Stafford CPU 150 fabric, commercially available from Stafford Textiles Limited of Toronto, Canada, a stretchable fabric that reduces "hammocking" allowing better pressure redistribution.

Referring now to FIG. 4, in one embodiment, cover 42 at the portions extending over the sides of the mattress 14 may support hook and loop fastener strips 44 (for example Velcro®) running generally horizontally along the vertically extending left and right edges and head and foot edges of the mattress 14 as stitched thereto. A bottom cover 46 having generally a central rectangular panel equal in area to the area of the soft face 18a or firm face 18b may have left and right extending flaps and headward and footward extending flaps 54 supporting mating hook and loop strips 55. In this way, the bottom cover 46 may be attached to either cover the firm face 18b when the soft face 18a is facing upward to be used by the patient, or to cover the soft face 18a when the farm face 18b is facing upward to be used by the patient, as held in place by inter-engagement of the strips 55 and 44. In either configuration of the bottom cover 46, an outwardly exposed surface of the panel 50 may provide for patches of slip resistant material 56 such as a rubber that will frictionally engage the sections 16 of the bed 10 (shown in FIG. 1) to hold the mattress 14 in place during articulation of the bed 10.

Figure 5:
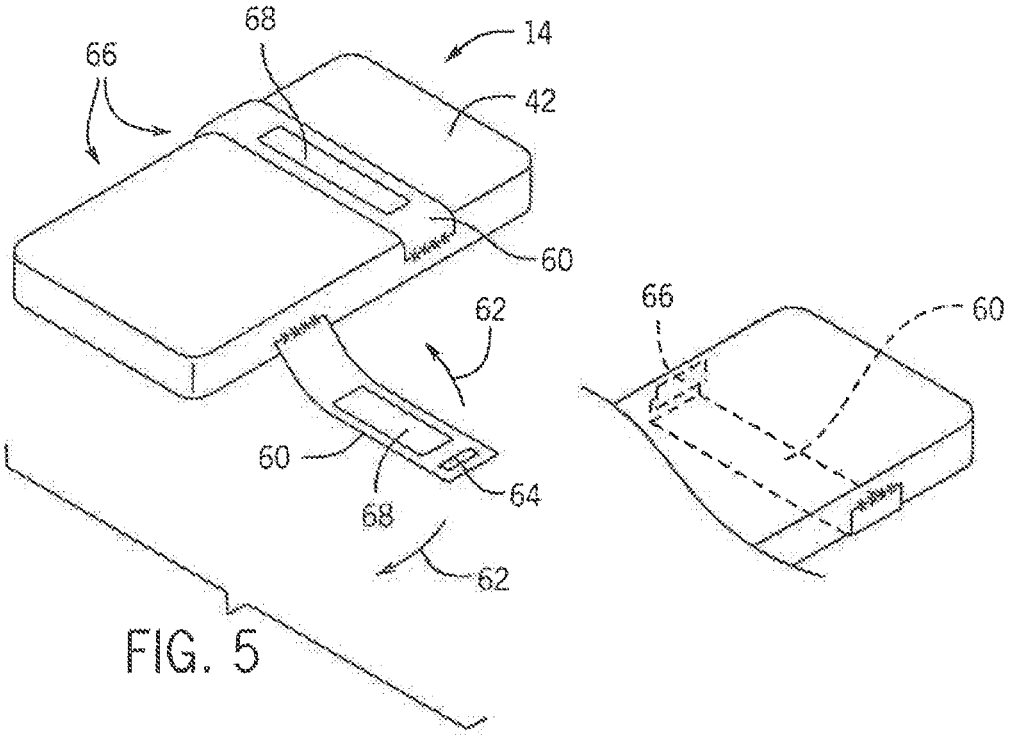
FIG. 5 is a figure similar to FIG. 4 showing an alternative embodiment where the nonskid surfaces are placed on straps fixedly attached to one side of the mattress to be folded over or underneath the mattress depending on mattress orientation to expose a nonskid surface.

Referring now to FIG. 5, in an alternative embodiment, cover 42 may be attached to one vertical edge (a right edge as shown) of each of two rightwardly extending fabric strips 60 seamed at one edge to the cover 42 and having a length to be folded over or under the mattress 14 as indicated by arrows 62. When so folded, the fabric strips 60 may releasably attach to an opposite edge of the cover 42 by means of hook and loop fasteners 64 on the strips 60 and corresponding hook and loop fasteners 66 on imposed vertical edges of the cover 42. Both sides of the strips 60 may be coated with a nonskid material 68 such as rubber or the like so that some nonskid material 68 is exposed in either orientation.

Figure 6:
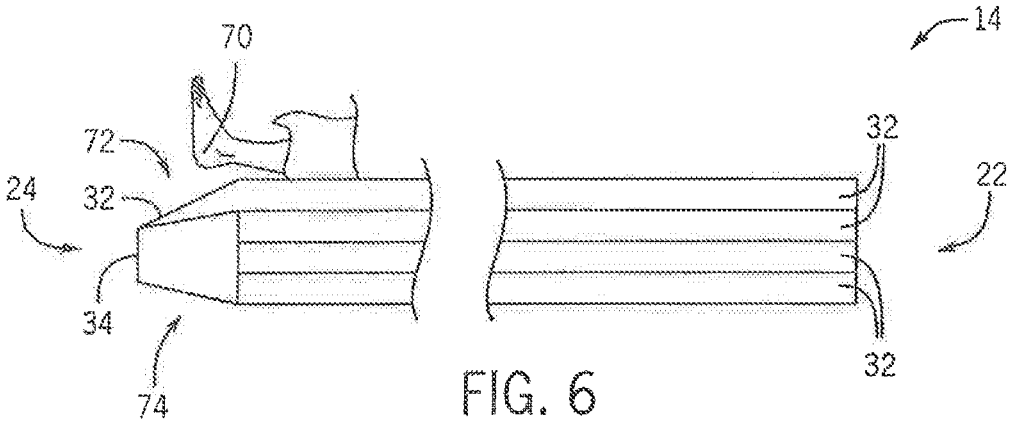
FIG. 6 is a cross-section similar to FIG. 3 showing opposed heel slope surfaces that may be provided by the present invention.

Referring now to FIG. 6, the layers 32a and 34 beneath the patient's heel 70 may be tapered to provide a downward slope 72 toward a foot end 24 of the mattress 14 on the upper surface of the mattress 14 and an upward slope 74 mirroring that of downward slope of 72 on the under surface of the mattress 14 so that in either orientation pressure on the patient's heel against the mattress 14 is reduced in favor of pressure against a larger surface of the patient's calf.

Figure 7:
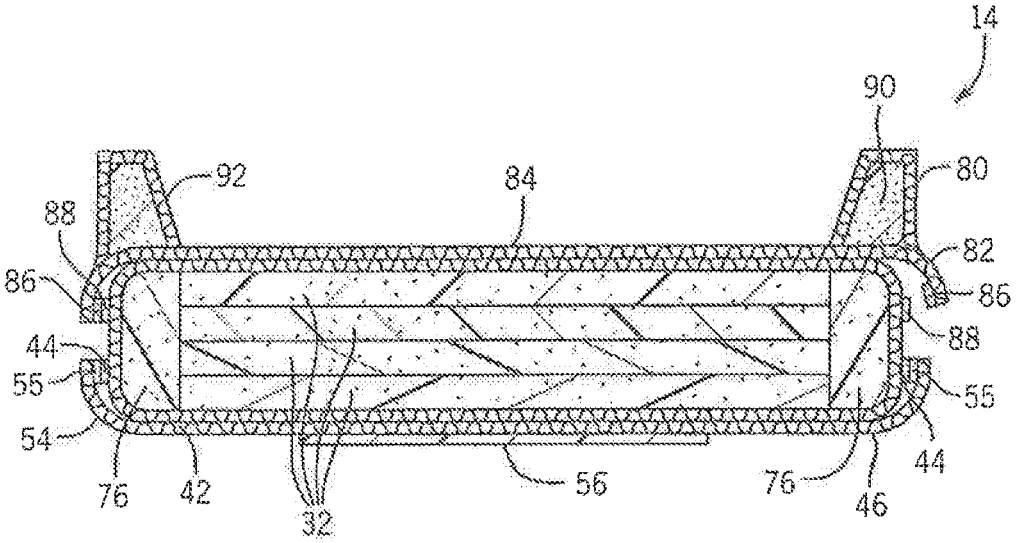
FIG. 7 is a cross-section taken along line 7-7 of FIG. 3 showing a repositionable top cover providing for left and right mattress bolsters.

Referring now to FIG. 7, in one embodiment, the left and right edges of the foam layers 32 (and 34) may optionally abut side bolsters 76 constructed of a high IFD foam, for example, having a value of 60. The side bolsters 76 extend the full height and length of the mattress 14 and have a thickness of approximately 2 to 3 inches to provide stiff elements at the side of the mattress 14 that tend to cradle the patient away from the edges of the mattress 14. The side bolsters 76 may be attached to the other foam layers and positioned inside of the fabric covering of the mattress 14.

An upper cover 80 may be constructed to be similar to the bottom cover 46 and to provide for left and right and foot and head tabs 82 extending away from a center panel 84. Each of the tabs 82 may include a hook and loop strip 86 attaching to a corresponding hook and loop strip 88 on the vertical walls of the cover 42 to retain the panel 84 against an upper surface of the mattress 14. Positioned on the left and right edge of the panel 84 near the left and right edge of the mattress 14 may be upwardly extending foam bolsters 90 that assist in retaining the patient centered in the panel 84. The bolsters 90 may include a central foam element, for example, having a high IFD of 75 and may extend upward by approximately 5 inches. The bolsters 90 may be held against the upper surface of the panel 84 by a fabric covering 92 attached by stitching to the remainder of the cover 80. In this way the bolsters 90 may be placed on either the soft face 18a or the firm face 18b according to how the mattress 14 is oriented.

In either orientation of the mattress 14, having the soft face 18a upward or the firm face 18b upward, the mattress 14 may receive a patient to provide a pressure redistributing surface suitable for sleeping and moderating high-pressure points which may lead to pressure ulcers or the like. The selection of the firmness of the exposed face of the mattress may be made according to a desire to control the concentration of pressure on the surface of the user's body and/or to provide for support of the patient in the particular posture, for example, to alleviate back pain or the like. In addition, the firmness of the exposed face of the mattress may be selected to control the temperature of the interface between the patient's skin and the mattress, with a firmer mattress, which is less enveloping, providing a cooler interface.

In this regard, it will be appreciated that not only will different users prefer different firmnesses in the mattress, but that a single individual may wish to vary the firmness of the mattress at different times. A single mattress offering two degrees of firmness provides a substantial cost savings in both situations.

It will be appreciated that other polymer foams may be used in lieu of polyurethane foam including for example latex foams and so-called "memory foam".

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

What we claim is:

1. A *reversible, dual-firmness* mattress comprising:

a mattress body having opposed first and second supporting surfaces each sized and adapted to receive and support a supine individual extending along a mattress length when either of the first and second supporting surfaces is upwardly facing and horizontal, the mattress body including at least three polymer foam layers [each having a different firmness and] extending along substantial portions of the mattress length, [a firmness of] the polymer foam layers [selected to present] *presenting* a lesser firmness to a supported individual lying on the first supporting surface than to the supported individual lying on the second supporting surface; and a cover fitting around the mattress body to retain the mattress body therein;

[wherein a first polymer foam layer adjacent to the first supporting surface has a lesser indentation force deflection (IFD) than the polymer foam layer adjacent to the second supporting surface and a third polymer foam layer positioned between the first and second polymer foam layers and having an IFD greater than the IFD of the first polymer foam layer and the second polymer foam layer]

*wherein a first polymer foam layer that defines a core layer as positioned between a second and third polymer foam layers has an indentation force deflection (IFD) greater than either of the second and third polymer foam layers and wherein the at least three polymer foam layers are adhered together so that the mattress body is unitary; and*

*wherein the second polymer foam layer has a lesser IFD than the third polymer foam layer.*

2. The *reversible, dual-firmness* mattress of claim 1 further including a fourth polymer foam layer positioned between the [first] *second* and third polymer foam layers having a greater IFD than the [first] *at least one of the second and third* polymer foam [layer] *layers* and a lesser IFD [than] *then* the [third] *first* polymer foam layer.

3. The *reversible, dual-firmness* mattress of claim 1 wherein at least some of the polymer foam layers do not extend over a foot portion of the mattress length, the foot portion adapted to support feet of the supine individual; and including at least one foot region polymer foam element extending along the mattress length in the foot portion having firmness no more than a least firmness of the different polymer foam layers outside of the foot portion.

4. The *reversible, dual-firmness* mattress of claim 3 wherein the foot region polymer foam element has a uniform firmness.

5. The *reversible, dual-firmness* mattress of claim 3 wherein the foot region provides a reduced mattress thickness tapering inward to an end of the mattress.

6. The *reversible, dual-firmness* mattress of claim 1 providing opposed left and right bolsters of polymer foam having an firmness no less than outermost of the polymer foam layers, the left and right bolsters extending along a left and right edge of the mattress and attached to the polymer foam layers.

7. The *reversible, dual-firmness* mattress of claim 1 further including [a second cover outside the first cover wherein the second cover includes] indicia indicating relative firmness of the first and second opposed surfaces[; and wherein the first cover and second cover cover the substantial entirety of the polymer foam layers].

8. The *reversible, dual-firmness* mattress of claim 1 wherein the first and second opposed surfaces are substantially planar without a convoluted surface.

9. A *reversible, dual-firmness* mattress comprising:

a mattress body having [opposed] *a* first *supporting surface generally disposed in a first plane* and *an opposed* second supporting [surfaces] *surface generally disposed in a second plane different than the first plane, one of the first or second supporting surfaces overlying the opposed first or second supporting surface when either of the first or second supporting surfaces is upwardly facing and horizontal,* each *of the first and second supporting surfaces* sized and adapted to receive and support a supine individual extending along a mattress length when either of the first and second supporting surfaces is upwardly facing and horizontal, *the first supporting surface comprising a first plurality of outer edges generally disposed within the first plane and the second supporting surface comprising a second plurality of outer edges generally disposed within the second plane that are each individually coplanar with at least one of the outer edges in the first plurality of outer edges,* the mattress body including at least three polymer foam layers each having a different firmness and extending along substantial portions of the mattress length, a firmness of the polymer foam layers selected to present a lesser firmness to a supported individual lying on the first supporting surface than to the supported individual lying on the second supporting surface; and a cover fitting around the mattress body to retain the mattress body therein;

the mattress further including a bottom cover adjustable to be positioned over at least a portion of the bottom of the mattress when the mattress is in either of two orientations with the opposed first or second supporting surface uppermost, the bottom cover including outwardly exposed anti-slip material.

10. The *reversible, dual-firmness* mattress of claim 9 wherein the bottom cover is permanently attached to [a] *the* cover [fully surrounding] *fitting around* the mattress *body* at one edge of the bottom cover and releasably attachable to the cover [fully surrounding] *fitting around* the mattress *body* at an opposed edge of the bottom cover.

11. The *reversible, dual-firmness* mattress of claim 10 wherein the first and second surfaces are not convoluted.

12. The *reversible, dual-firmness* mattress of claim 9 wherein the bottom cover is releasably attachable to [a mattress] *the* cover with hook and loop fasteners.

13. A *reversible, dual-firmness* mattress comprising:

a mattress body having [opposed] *a* first *supporting surface generally disposed in a first plane* and *an opposed* second supporting [surfaces] *surface generally disposed in a second plane different than the first plane,* each *of the first and second supporting surfaces* sized and adapted to receive and support a supine individual extending along a mattress length when either of the first and second supporting surfaces is upwardly facing and horizontal, *one of the first or second supporting surfaces vertically overlying the opposed first or second supporting surface when either of the first or second supporting surfaces is upwardly facing and horizontal,* the mattress body including at least three polymer foam layers each having a different firmness and extending along substantial portions of the mattress length, a firmness of the polymer foam layers selected to present a lesser firmness to a supported individual lying on the first supporting surface than to the supported individual lying on the second supporting surface; and a cover fitting around the mattress body to retain the mattress body therein;

the mattress further including a top cover adjustable to be positioned over at least a portion of the top of the mattress body when the mattress body is in either of two orientations with the opposed first or second supporting surface uppermost, the top cover providing upwardly extending bolsters positionable at opposed left and right edges of the mattress body.

14. The *reversible, dual-firmness* mattress of claim 13 wherein the top cover is releasably attachable to [a] *the* cover [of] *fitting around* the mattress body with hook and loop fasteners.

[15. The mattress of claim 13 wherein the polymer foam is a polyurethane foam.]

16. A *reversible, dual-firmness* mattress comprising:

a mattress body having at least three layers of polymer foam material of different *indentation force deflection* (IFD) values *and adhered together so that the mattress body is unitary*, the layers of polymer foam material extending generally parallel to opposed first and second support surfaces of the mattress *and presenting a lesser firmness to a supported individual lying on the first support surface that is generally disposed in a first plane than to the supported individual lying on the second support surface that is generally disposed in a second plane different than the first plane*, *wherein one of the first or second supporting surfaces overlies the opposed first or second supporting surface when either of the first or second supporting surfaces is upwardly facing and horizontal,* the volume weighted IFD values in a half of the mattress closest to the first support surface being lower than volume weighted IFD values in a half of the mattress closest to the second support surface;

*wherein the first supporting surface comprises a first plurality of outer edges generally disposed within the first plane and the second supporting surface comprises a second plurality of outer edges generally disposed within the second plane that are each individually coplanar with at least one of the outer edges in the first plurality of outer edges;* and a fabric cover surrounding the mattress body.

17. A *reversible, dual-firmness* mattress comprising:

a mattress body having *an* opposed first *supporting surface generally disposed in a first plane* and *an opposed* second supporting [surfaces] *surface generally disposed in a second plane different than the first plane,* each *of the first and second supporting surface* sized and adapted to receive and support a supine individual when the surface is upwardly facing and horizontal, [an] *wherein one of the first or second supporting surfaces overlies the opposed first or second supporting surface when either of the first and second supporting surfaces is upwardly facing and horizontal, wherein the first supporting surface comprises a first plurality of outer edges generally disposed within the first plane and the second supporting surface comprises a second plurality of outer edges generally disposed within the second plane that are each individually coplanar with at least one of the outer edges in the first plurality of outer edges, and a* firmness of the first and second supporting surfaces selected to present a greater firmness to a supported individual lying on the first supporting surface than to the supported individual lying on the second supporting surface;

an inner cover fitting around the mattress body to retain the mattress body therein; and an outer cover removably positionable over the inner cover to present a slip resistant surface at a bottom of the mattress body and not at a top of the mattress body; and wherein the inner cover and outer cover [the] *a* substantial entirety of the [polymer foam layers] *mattress body.*

*18. A reversible, dual-firmness mattress comprising:*

*a mattress body having at least three layers of polymer foam material adhered together so that the mattress body is unitary, the at least three layers extending generally parallel to opposed and overlying first and second support surfaces of the mattress when either of the first and second supporting surfaces is upwardly facing and horizontal, the first supporting surface generally disposed within a first plane and comprising a plurality of first supporting surface sides disposed within the first plane, and the second supporting surface generally disposed within a second plane different than the first plane and comprising a plurality of second supporting surface sides disposed within the second plane that are each individually coplanar with a corresponding first supporting surface side, the layers presenting a lesser firmness to a supported individual lying on the first support surface than to the supported individual lying on the second support surface, each of the layers having an indention force deflection (IFD) value such that the total of the IFD values of each given layer or portion thereof located in a first half of the mattress nearest the first support surface times a thickness of the respective given layer or portion thereof located in the first half of the mattress is less than a total of the IFD values of each given layer or portion thereof located in a second half of the mattress nearest the second support surface times a thickness of the respective given layer or portion thereof located in the second half of the mattress;*

*a cover surrounding the mattress body; and*

*wherein a first layer positioned between a second and third layer of the at least three layers has an IFD value greater than the other two layers.*

*19. The reversible, dual-firmness mattress of claim 18 including indicia indicating relative presented firmness of the first and second support surfaces and attached to the reversible, dual firmness mattress.*

*20. The reversible, dual-firmness mattress of claim 18 further including a fourth layer positioned between the second and third layers and having a greater IFD value than a closest of second and third layers and a lesser IFD value then the first layer.*

*21. The reversible, dual-firmness mattress of claim 18 wherein the mattress body is free from rigid elements that would prevent flexure of the mattress body along its length.*

*22. The reversible, dual-firmness mattress of claim 18 wherein at least one layer is memory foam.*

*23. The reversible, dual-firmness mattress of claim 18 wherein at least three layers of polymer foam material have different thicknesses.*

*24. The reversible, dual-firmness mattress of claim 18 wherein the first layer has an IFD value at least twice that of at least one of the second and third layer.*

*25. The reversible, dual-firmness mattress of claim 24 wherein one of the second and third layers has an IFD value at least one and a half times the IFD value other of the second and third layers.*

*26. The reversible, dual-firmness mattress of claim 18 wherein the at least three layers of polymer foam material are adhered together by adhesive.*

*27. A reversible, dual-firmness mattress comprising:*

*a mattress body having at least three layers of polymer foam material adhered together so that the mattress body is unitary, the at least three layers extending generally parallel to opposed first and second support surfaces of the mattress, the layers presenting a lesser firmness to a supported individual lying on the first support surface than to the supported individual lying on the second support surface, each of the layers having an indention force deflection (IFD) value such that the total of the IFD values of each given layer or portion thereof located in a first half of the mattress nearest the first support surface times a thickness of the respective given layer or portion thereof located in the first half of the mattress is less than a total of the IFD values of each given layer or portion thereof located in a second half of the mattress nearest the second support surface times a thickness of the respective given layer or portion thereof located in the second half of the mattress;*

*a cover surrounding the mattress body; and*

*wherein a first layer positioned between a second and third layer of the at least three layers has an IFD value greater than the other two layers, and*

*wherein IFD values of each layer decrease progressively without increasing from a center of the mattress halfway between the first and second support surfaces to the first and second support surfaces.*

*28. A reversible, dual-firmness mattress comprising:*

*a mattress body having at least three layers of polymer foam material adhered together so that the mattress body is unitary, the at least three layers extending generally parallel to opposed first and second support surfaces of the mattress, the layers presenting a lesser firmness to a supported individual lying on the first support surface than to the supported individual lying on the second support surface, each of the layers having an indention force deflection (IFD) value such that the total of the IFD values of each given layer or portion thereof located in a first half of the mattress nearest the first support surface times a thickness of the respective given layer or portion thereof located in the first half of the mattress is less than a total of the IFD values of each given layer or portion thereof located in a second half of the mattress nearest the second support surface times a thickness of the respective given layer or portion thereof located in the second half of the mattress;*

*a cover surrounding the mattress body,*

*wherein a first layer positioned between a second and third layer of the at least three layers has an IFD value greater than the other two layers, and,*

*wherein each of the layers has an IFD value such that the total of the IFD values of each given layer or portion thereof located in a first half of the mattress nearest the first support surface times a thickness of the respective given layer or portion thereof located in the first half of the mattress is at least 50% less than the total of the IFD values of each given layer or portion thereof located in a second half of the mattress nearest the*

*second support surface times a thickness of the respective given layer or portion thereof located in the second half of the mattress.*

*29. A reversible, dual-firmness mattress comprising:*

*a mattress body having at least three layers of polymer foam material adhered together so that the mattress body is unitary and adapted to flex along its length, the at least three layers extending generally parallel to opposed first and second support surfaces of the mattress, the layers adapted to present a lesser firmness to a supported individual lying on the first support surface than to the supported individual lying on the second support surface, each of the layers having an indention force deflection (IFD) value such that the total of the IFD values of each given layer or portion thereof located in a first half of the mattress nearest the first support surface times a thickness of the respective given layer or portion thereof located in the first half of the mattress is less than a total of the IFD values of each given layer or portion thereof located in a second half of the mattress nearest the second support surface times a thickness of the respective given layer or portion thereof located in the second half of the mattress; and*

*a cover surrounding the mattress body;*

*wherein a first layer positioned between other two layers has an IFD value greater than the other two layer; and*

*further including indicia indicating relative firmness of the first and second support surfaces attached to the reversible, dual firmness mattress.*

*30. The reversible, dual-firmness mattress of claim 1, wherein the mattress is adapted to flex to conform to an articulating bed carriage when either of the first and second supporting surfaces are positioned on the articulating bed carriage.*

*31. The reversible, dual-firmness mattress of claim 16, wherein the mattress is adapted to flex to conform to an articulating bed carriage when either of the first and second support surfaces are positioned on the articulating bed carriage.*

*32. The reversible, dual-firmness mattress of claim 1, wherein one of the layers comprises a first and second component layer.*

* * * * *